US008807922B2

(12) United States Patent  (10) Patent No.: US 8,807,922 B2
Tietze et al.  (45) Date of Patent: Aug. 19, 2014

(54) LUBRICATION SYSTEM FOR A GEAR SYSTEM FOR A WIND TURBINE

(75) Inventors: Poul Torben Tietze, Brabrand (DK); Thomas Korsgaard Nielsen, Randers (DK)

(73) Assignee: Vestas Wind Systems, A/S, Aarhus N. (DK)

( * ) Notice: Subject to any disclaimer, the term of this patent is extended or adjusted under 35 U.S.C. 154(b) by 162 days.

(21) Appl. No.: 12/996,014

(22) PCT Filed: Jun. 2, 2009

(86) PCT No.: PCT/EP2009/056755
§ 371 (c)(1),
(2), (4) Date: Feb. 2, 2011

(87) PCT Pub. No.: WO2009/147147
PCT Pub. Date: Dec. 10, 2009

(65) Prior Publication Data
US 2011/0150655 A1  Jun. 23, 2011

Related U.S. Application Data

(60) Provisional application No. 61/057,913, filed on Jun. 2, 2008.

(30) Foreign Application Priority Data

Jun. 2, 2008 (DK) .............................. PA 2008 00750

(51) Int. Cl.
*F03D 11/00* (2006.01)
(52) U.S. Cl.
USPC .......................................... 415/111; 416/174
(58) Field of Classification Search
USPC ................ 184/6.4, 6.12, 6.13; 415/111, 112; 416/174; 417/2, 14, 26
See application file for complete search history.

(56) References Cited

U.S. PATENT DOCUMENTS

| 4,976,335 | A | 12/1990 | Cappellato |
| 5,115,887 | A | 5/1992 | Smith |
| 2005/0034925 | A1* | 2/2005 | Flamang et al. ............. 184/6.12 |

(Continued)

FOREIGN PATENT DOCUMENTS

| DE | 32 31 016 | 2/1984 |
| DE | 103 24 986 | 12/2004 |

(Continued)

*Primary Examiner* — Edward Look
*Assistant Examiner* — Sean J Younger
(74) *Attorney, Agent, or Firm* — Wood, Herron & Evans, LLP

(57) ABSTRACT

A lubrication system for a gear system of a wind turbine includes a first reservoir and a second reservoir adapted to contain lubricant. It further includes pump means arranged to supply lubricant from the first reservoir to the second reservoir during normal operation, and a distribution system fluidly connected between the first reservoir and the gear system in such a manner that lubricant can be supplied to the gear system from the first reservoir via the distribution system during normal operation. The lubrication system further comprises valve means being shiftable between a first position and a second position. In the first position a flow of lubricant from the second reservoir towards the gear system or the first reservoir is prevented, and in the second position it is allowed. The valve means operates in response to pressure changes in the lubrication system in such a manner that a predetermined pressure change automatically and directly causes the valve means to shift from the first position to the second position. Thereby it is ensured that the lubrication system is automatically, reliably and quickly switched to an emergency state in the case that a situation occurs which changes the pressure in the lubrication system in a predetermined manner. It is not necessary to rely on separate measurements of various parameters by independent probes or the like.

10 Claims, 6 Drawing Sheets

(56) References Cited

U.S. PATENT DOCUMENTS

2006/0065217 A1* 3/2006 Ikegawa .................. 123/41.42
2008/0116009 A1 5/2008 Sheridan et al.
2008/0116010 A1 5/2008 Portlock et al.

FOREIGN PATENT DOCUMENTS

| FR | 2 386 743 | 11/1978 |
| GB | 1167692 | 10/1969 |
| GB | 2 201 200 | 8/1988 |

* cited by examiner

LUBRICATION SYSTEM FOR A GEAR SYSTEM FOR A WIND TURBINE

PRIORITY CLAIM

This is a U.S. national stage of application No. PCT/EP2009/056755, filed on Jun. 2, 2009. Priority is claimed on the following applications: Denmark Application No.: PA 2008 00750, Filed: Jun. 2, 2008; and U.S. Application No. 61/057,913, Filed: Jun. 2, 2008; the content of which are incorporated here by reference.

FIELD OF THE INVENTION

The present invention relates to a system for providing lubrication for a gear system for a wind turbine. More particularly, the present invention relates to a lubrication system which can be automatically switched to an emergency state in the case that an emergency situation is occurring.

BACKGROUND OF THE INVENTION

Gear systems for wind turbines require lubrication during normal operation. For efficiency reasons it is sometimes desirable to provide lubrication to the gear system by means of a circulation system circulating a minimum amount of lubricant in such a manner that only an amount of lubricant necessary for lubricating the gear system during operation is present in the gear system at any time during normal operation. However, this has the disadvantage that in the case of an emergency, possibly causing the gear system to slow down or even stop, the gear system is left with insufficient lubrication. It has previously been attempted to address this problem.

GB 2 201 200 discloses a method of lubricating gear means for a wind energy installation. The method comprises the steps of maintaining operational lubrication by an oil-circulating system with injection lubrication, with the oil being cooled at the same time. The normal height of the oil level in the gear means casing is increased to a height necessary for splash lubrication when the rotational speed of the gear means falls below a settable value. To increase the height of the oil level, an additional quantity of oil is fed to the casing from a reservoir.

In the method disclosed in GB 2 201 200 it is necessary to measure the rotational speed of the gear means in order to detect that a situation is occurring which requires a higher oil level, and the reliability of the method is thereby dependent on the reliability of a sensor used for measuring the rotational speed. Furthermore, it is not possible to reduce the response time of the system below a value defined by the time it takes to detect the rotational speed, compare the detected rotational speed to a threshold value, determine that the threshold value has been exceeded and initiate increasing of the oil level. Thus, the system has an inherent inertia.

DESCRIPTION OF THE INVENTION

It is an object of embodiments of the invention to provide a lubrication system for a gear system for a wind turbine, the lubrication system being able to switch to an emergency mode with a shorter response time than similar prior art lubrication systems.

It is a further object of embodiments of the invention to provide a lubrication system for a gear system for a wind turbine, the lubrication system being more failsafe than similar prior art lubrication systems.

The invention provides a lubrication system for a gear system for a wind turbine, the lubrication system comprising:
- a first reservoir adapted to contain lubricant,
- a second reservoir adapted to contain lubricant,
- pump means arranged to supply lubricant from the first reservoir to the second reservoir during normal operation,
- a distribution system fluidly connected between the first reservoir and the gear system in such a manner that lubricant can be supplied to the gear system from the first reservoir via the distribution system during normal operation,
- valve means being shiftable between a first position in which a flow of lubricant from the second reservoir directly towards the gear system or the first reservoir is prevented and a second position in which such a flow of lubricant is allowed, wherein the valve means operates in response to pressure changes in the lubrication system in such a manner that a predetermined pressure change automatically and directly causes the valve means to shift from the first position to the second position.

The lubricant is a substance which is suitable for lubricating the moving parts of the gear system. The lubricant is preferably a liquid, most preferably an oil.

The pump means is arranged to supply lubricant from the first reservoir to the second reservoir during normal operation. This is preferably performed by substantially continuously pumping lubricant from the first reservoir to the second reservoir. Thereby a continuous supply of lubricant to the second reservoir is ensured, at least as long as the lubrication system operates in a normal manner.

The distribution system is fluidly connected between the first reservoir and the gear system in such a manner that lubricant can be supplied from the first reservoir to the gear system via the distribution system during normal operation. The lubricant may be supplied by means of separate pump means, or using the pump means used for supplying lubricant from the first reservoir to the second reservoir. This will be described further below. Accordingly, lubricant is supplied from the first reservoir to the gear system via the distribution system. Accordingly, the distribution system is the part of the system which distributes lubricant to the gear system in a desired and appropriate manner during normal operation. Preferably, the distribution system is adapted to ensure an appropriate distribution of lubricant to various parts of the gear system.

The valve means is shiftable between a first position and a second position. When the valve means is in the first position a flow of lubricant from the second reservoir directly towards the gear system or the first reservoir is prevented. When the valve means is in the second position such a flow of lubricant is allowed. Thus, when the valve means is in the first position, the gear system or the first reservoir do not receive lubricant directly from the second reservoir. Accordingly, the gear system only receives lubricant via the distribution system. On the other hand, when the valve means is in the second position, such fluid flow is allowed, and the lubricant which was previously supplied to the second reservoir by means of the pump means can be supplied directly to the gear system or to the first reservoir, and from there to the gear system. Accordingly, an additional supply of lubricant is supplied to the gear system when the valve means is in the second position.

The valve means operates in response to pressure changes in the lubrication system in such a manner that a predetermined pressure change automatically and directly causes the valve means to shift from the first position to the second position. Thus, when a predetermined pressure change occurs the lubrication system is switched from a normal operation mode to an operation mode which is appropriate for emergency operation. Since the switch is performed automatically and directly, and solely in response to a pressure change occurring as a consequence of a failure condition, a fast response time is ensured. Furthermore, the system is failsafe, since it does not rely on separate measurements of one or more relevant parameters.

The pressure change may, e.g., be a change in pressure in the first and/or the second reservoir, in one or more supply lines of the lubrication system, and/or in any other appropriate part of the lubrication system. The predetermined pressure change is preferably of a kind and magnitude which indicates that it is necessary to switch to emergency operation of the lubrication system.

A pressure change may, e.g., be caused by a stop in operation of the pump means, e.g. due to a failure in the pump means or an interruption of the power supply to the pump means.

The valve means may be adapted to be in the first position during normal operation and in the second position in the case that an emergency situation is occurring. As described above, this is the case when the predetermined pressure change is of a kind and magnitude which indicates that a situation is occurring which requires emergency lubrication of the gear system, e.g. a situation in which the gear is running slower than during normal operation.

The second reservoir may be pressurized during normal operation. According to this embodiment the second reservoir is preferably maintained at a pressure which exceeds an ambient pressure. The ambient pressure is preferably at or near atmospheric pressure, and the pressure in the second reservoir is preferably significantly higher, such as at least 4 bar, such as approximately 6 bar. According to this embodiment the valve means may advantageously operate in response to the pressure in the second reservoir, preferably in such a manner that a drop in the pressure of the second reservoir causes the valve means to switch to the second position. Such a drop in pressure may, e.g., occur due to a stop in operation of the pump means.

The second reservoir may be arranged in such a manner relative to the gear system and the first reservoir that lubricant can be moved by means of gravity from the second reservoir towards the gear system. According to this embodiment the second reservoir is preferably arranged at a higher level than the gear system, and preferably also at a higher level than the first reservoir. In this case lubricant may be pumped from the first reservoir to the second reservoir by means of the pump means, and the lubricant may then be moved due to gravity from the second reservoir towards the gear system, and further on to the first reservoir, also due to gravity. Alternatively or additionally, an increased pressure in the second reservoir may be used for moving the lubricant from the second reservoir towards the gear system or the first reservoir when the valve means is in the second position.

The valve means may comprise at least one check valve. A check valve is in its open or closed state depending on a pressure difference between two sides of the check valve. Thus, an appropriate change in this pressure difference will cause the check valve to open or close. Accordingly, a check valve is very suitable for use in the system according to the invention, because it inherently operates in response to pressure changes. Alternatively or additionally, the valve means may comprise at least one spring valve.

According to one embodiment, the second reservoir may be fluidly connected between the first reservoir and the distribution system, lubricant thereby being supplied from the first reservoir, via the second reservoir and the distribution system during normal operation. According to this embodiment, the lubricant supplied to the second reservoir by means of the pump means forms part of the lubricant which is circulated during normal operation of the lubrication system. Furthermore, the pump means used for supplying lubricant to the second reservoir may, in this embodiment, advantageously be used for providing this circulation of lubricant.

As an alternative, the first reservoir may be fluidly connected to the distribution system and to the second reservoir via parallel flow paths. According to this embodiment, the lubricant which is supplied to the second reservoir does not form part of the lubricant which is circulated during normal operation of the lubrication system. Instead, a circulation flow is formed from the first reservoir to the distribution system and further on to the gear system, while a separate and parallel flow of lubricant is provided from the first reservoir to the second reservoir. Also in this case, the pump means may further be adapted for supplying lubricant directly from the first reservoir to the distribution system during normal operation. In this case, the fluid flow from the first reservoir to the second reservoir may be provided as a partial flow of the circulation flow towards the distribution system. Alternatively, the circulation flow may be provided by separate pump means.

The lubrication system may further comprise an emergency supply path fluidly interconnecting the second reservoir and the gear system when the valve means is in the second position. According to this embodiment lubricant is supplied from the first reservoir to the gear system via the distribution system, and possibly via the second reservoir, during normal operation, and from the second reservoir via the emergency supply path during emergency operation. Thus, lubrication of the gear system is ensured in any of these situations, but the manner of supplying lubricant varies depending on whether the lubrication system is operated in accordance with normal operation or in accordance with emergency operation. For instance, the emergency supply path may supply additional lubricant.

Alternatively, the lubrication system may further comprise an emergency supply path fluidly interconnecting the second reservoir and the first reservoir when the valve means is in the second position. According to this embodiment, additional lubricant from the second reservoir is supplied to the first reservoir during emergency operation. A return path from the gear system to the first reservoir is normally provided. Therefore an increased lubricant level in the first reservoir will normally result in an increased lubricant level in the gear system. Thus, according to this embodiment additional lubricant may also be provided to the gear system during emergency operation.

The lubrication system of the invention may advantageously be arranged to provide lubrication for a gear system of a wind turbine, the wind turbine comprising the gear system as well as the lubrication system.

BRIEF DESCRIPTION OF THE DRAWINGS

The invention will now be described in further detail with reference to the accompanying drawings in which.

DETAILED DESCRIPTION OF THE DRAWINGS

Figure 1:
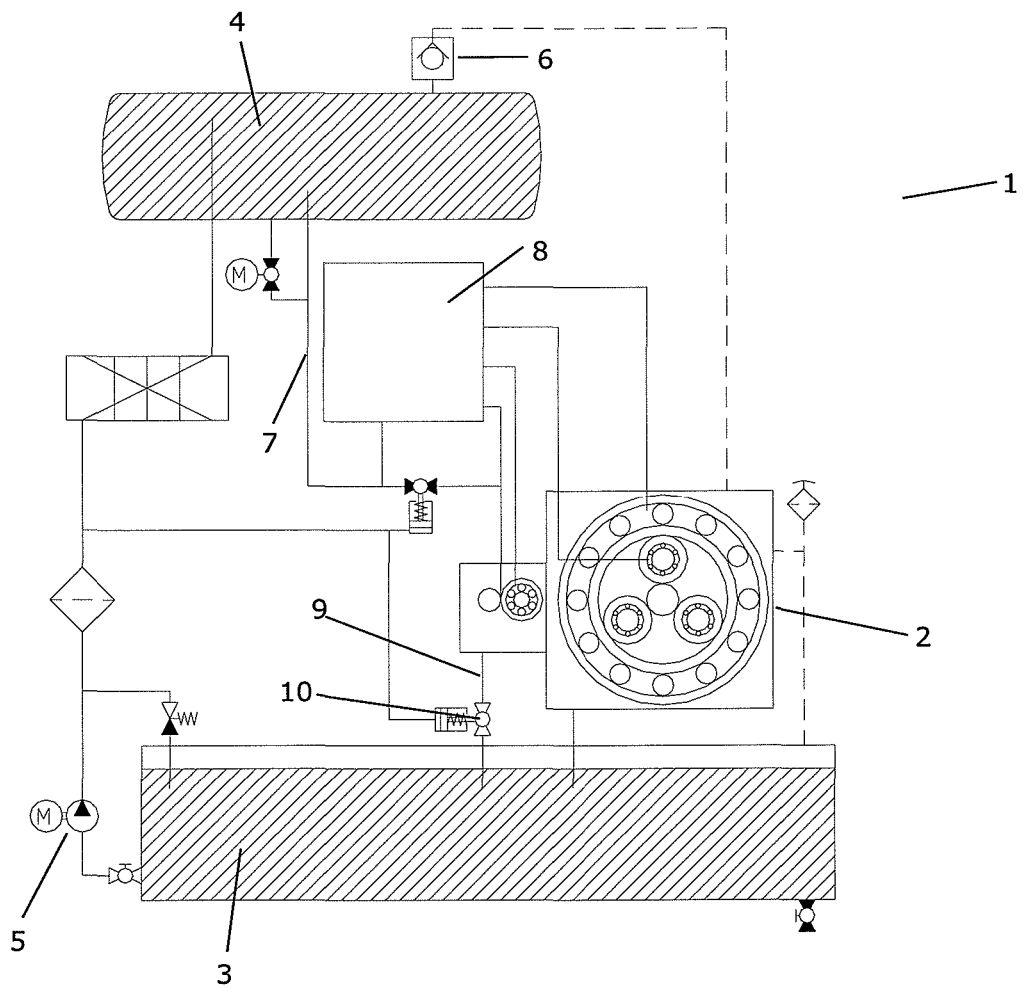
FIG. 1 is a diagrammatic view of a lubrication system according to a first embodiment of the invention during normal operation.

FIG. 1 is a diagrammatic view of a lubrication system 1 according to a first embodiment of the invention. The lubrication system 1 is used for providing lubrication for a gear system 2 which is arranged in a wind turbine (not shown). In FIG. 1 the lubrication system 1 is shown during normal operation.

The lubrication system 1 comprises a first reservoir 3 and a second reservoir 4. The first reservoir 3 and the second reservoir 4 are fluidly connected, and a pump 5 continuously pumps lubricant from the first reservoir 3 to the second reservoir 4, thereby ensuring that the second reservoir 4 is full and that a pressure of approximately 6 bar is maintained in the second reservoir 4. Check valve 6 provides venting between the second reservoir 4 and the gear system 2. This will be explained further below.

Lubricant leaves the second reservoir 4 via line 7 and enters distribution system 8. The distribution system 8 ensures that lubricant is distributed directly to various parts of the gear system 2, thereby providing lubrication to the gear system 2. From the gear system 2 the lubricant returns to the first reservoir 3 via line 9 and valve 10, which is open during normal operation.

Figure 2:
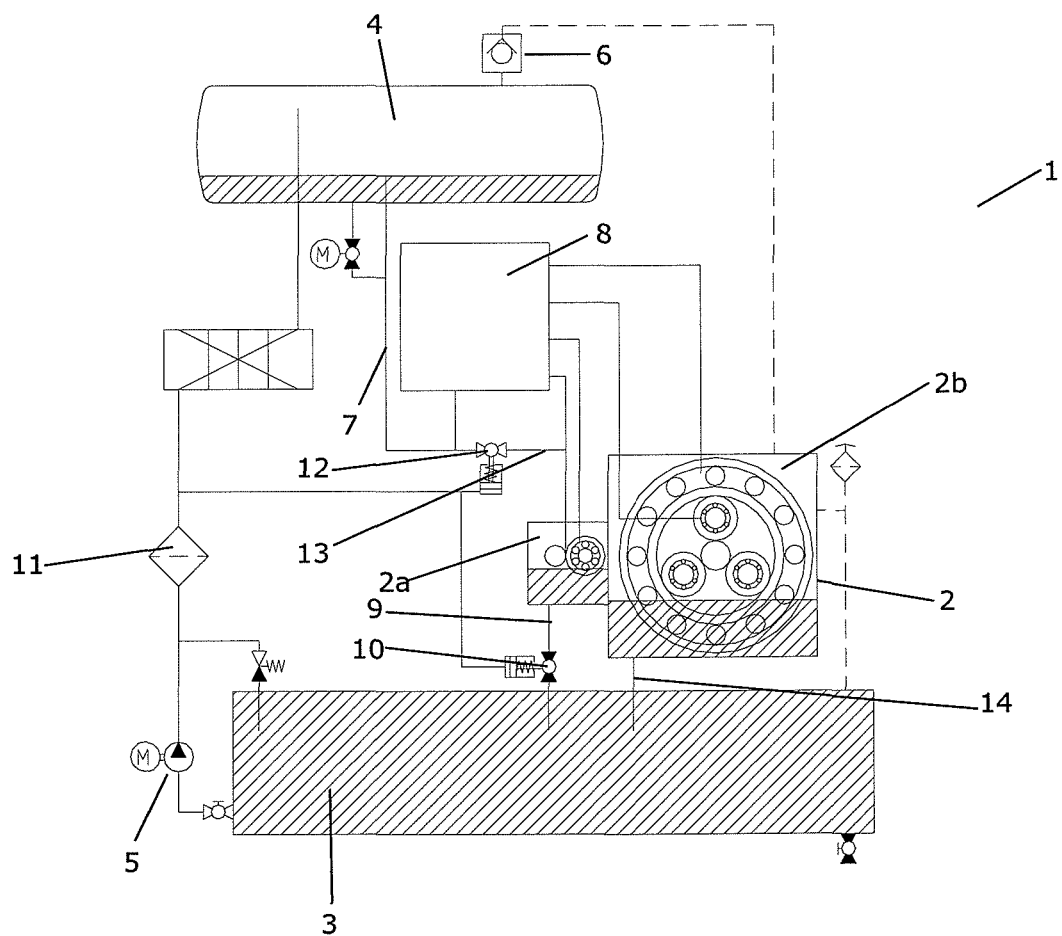
FIG. 2 is a diagrammatic view of the lubrication system of FIG. 1 during emergency operation.

FIG. 2 is a diagrammatic view of the lubrication system 1 of FIG. 1. In FIG. 2 the lubrication system 1 is shown in an emergency state. This may, e.g., be caused by a failure of the power supply to the pump 5. In this case the pump 5 stops pumping lubricant from the first reservoir 3 to the second reservoir 4. As a consequence, the pressure at position 11 in the lubrication system 1 drops. This causes valve 10 to close and valve 12 to open. Thereby lubricant leaving the second reservoir 4 via line 7 enters line 13, via valve 12, thereby bypassing the distribution system 8 and supplying lubricant directly to the gear system 2. Comparing FIG. 1 and FIG. 2 it is clear that the level of lubricant in the gear system 2 is higher in the emergency state than during normal operation.

When lubricant is supplied to the gear system 2 via line 9, the lubricant first enters a first gear part 2a. When the lubricant reaches a certain level in the first gear part 2a it flows into a second gear part 2b via an opening (not shown). From the second gear part 2b the lubricant returns to the first reservoir 3 via line 14.

Figure 3:
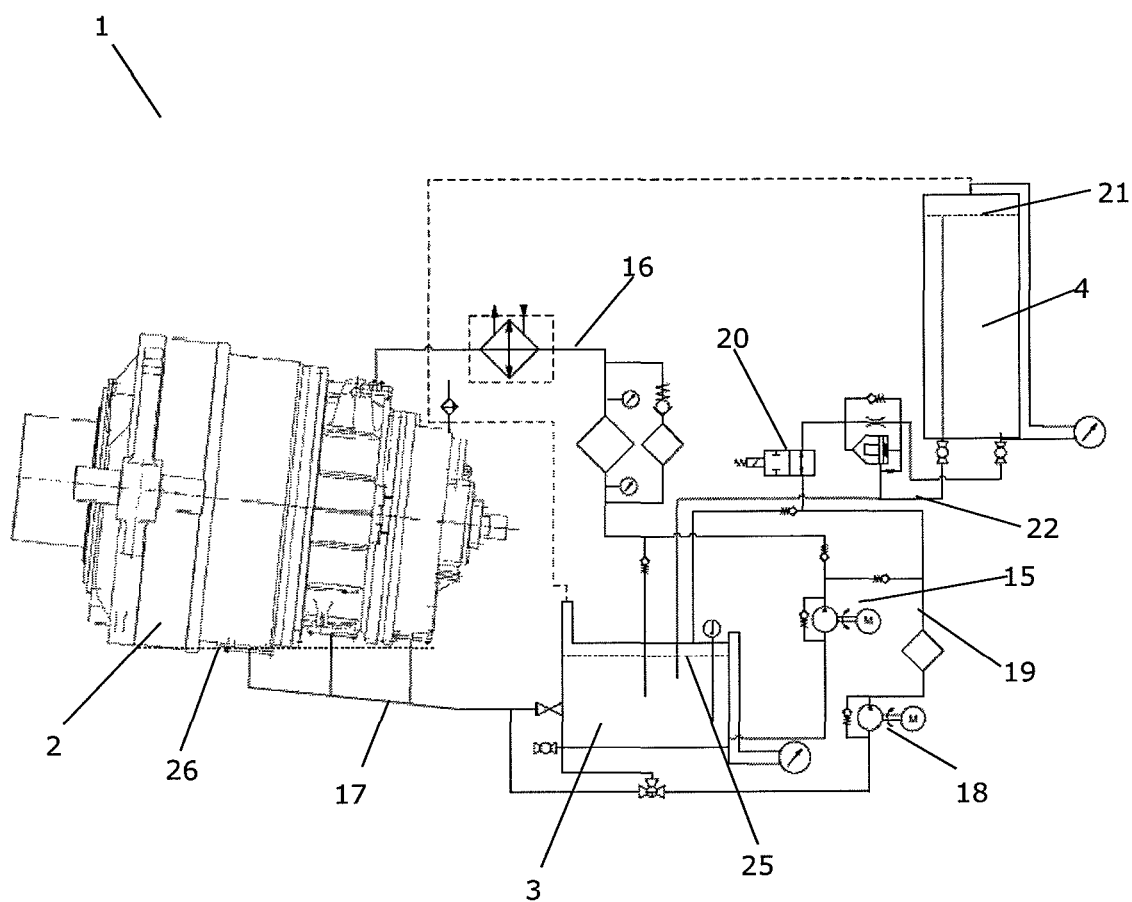
FIG. 3 is a diagrammatic view of a lubrication system according to a second embodiment of the invention during normal operation.

FIG. 3 is a diagrammatic view of a lubrication system 1 according to a second embodiment of the invention. The lubrication system 1 is used for providing lubrication for a gear system 2 in a wind turbine (not shown). In FIG. 3 the lubrication system 1 is shown during normal operation.

The lubrication system 1 comprises a first reservoir 3 and a second reservoir 4. During normal operation pump 15 continuously supplies lubricant from the first reservoir 3 to the gear system 2 via line 16 and a distribution system (not shown). The lubricant is returned from the gear system 2 to the first reservoir 3 via line 17. The lubricant level 25 in the first reservoir 3 determines the lubricant level 26 in the gear system 2, due to the mutual position of the first reservoir 3 and the gear system 2, and due to the fluid connections 16, 17 between the first reservoir 3 and the gear system 2. It is clear from FIG. 3 that, during normal operation, the lubricant level 26 in the gear system 2 is kept at a minimal level.

Simultaneously, pump 18 supplies lubricant from the first reservoir 3 to the second reservoir 4 via line 19 and valve 20 which is in an open state, thereby ensuring that the lubricant level 21 of the second reservoir 4 is maintained at a maximum level. When the lubricant level 21 in the second reservoir 4 reaches the maximum level shown in FIG. 3, lubricant is returned to the first reservoir 3 via overflow line 22.

Figure 4:
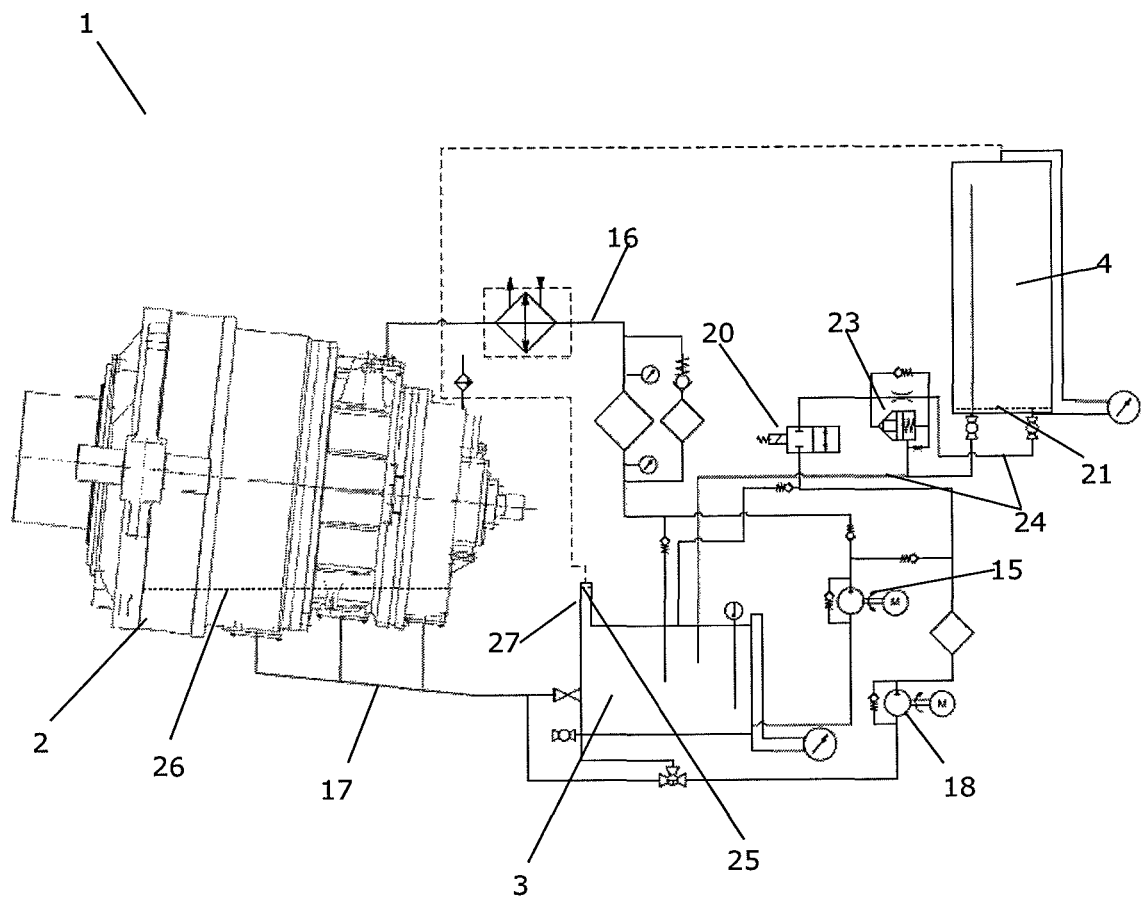
FIG. 4 is a diagrammatic view of the lubrication system of FIG. 3 during emergency operation.

FIG. 4 is a diagrammatic view of the lubrication system 1 of FIG. 3. In FIG. 4 the lubrication system 1 is shown in an emergency state. This may, e.g., be caused by a failure of the power supply to the pumps 15, 18. In this case the pump 15 no longer supplies lubricant from the first reservoir 3 to the gear system 2, and the pump 18 no longer supplies lubricant from the first reservoir 3 to the second reservoir 4. Furthermore, valve 20 is moved to a closed position. The pressure changes in the lubricant system 1 resulting from the lack of power supply to the pumps 15, 18 causes valve 23 to open, thereby allowing lubricant from the second reservoir 4 to flow from the second reservoir 4 towards the first reservoir 3, via lines 24 and valve 23. Accordingly, the lubricant level 21 of the second reservoir 4 is lowered while the lubricant level 25 of the first reservoir 3 is raised. Since the lubricant level 26 of the gear system 2 is determined by the lubricant level 25 of the first reservoir 3 as described above, the lubricant level 26 of the gear system 2 is raised correspondingly, via line 17, thereby allowing splash lubrication of the gear system 2. The narrow protrusion 27 formed on the first reservoir 3 allows the required lubricant levels 25, 26 to be reached with a minimal amount of lubricant.

Figure 5:
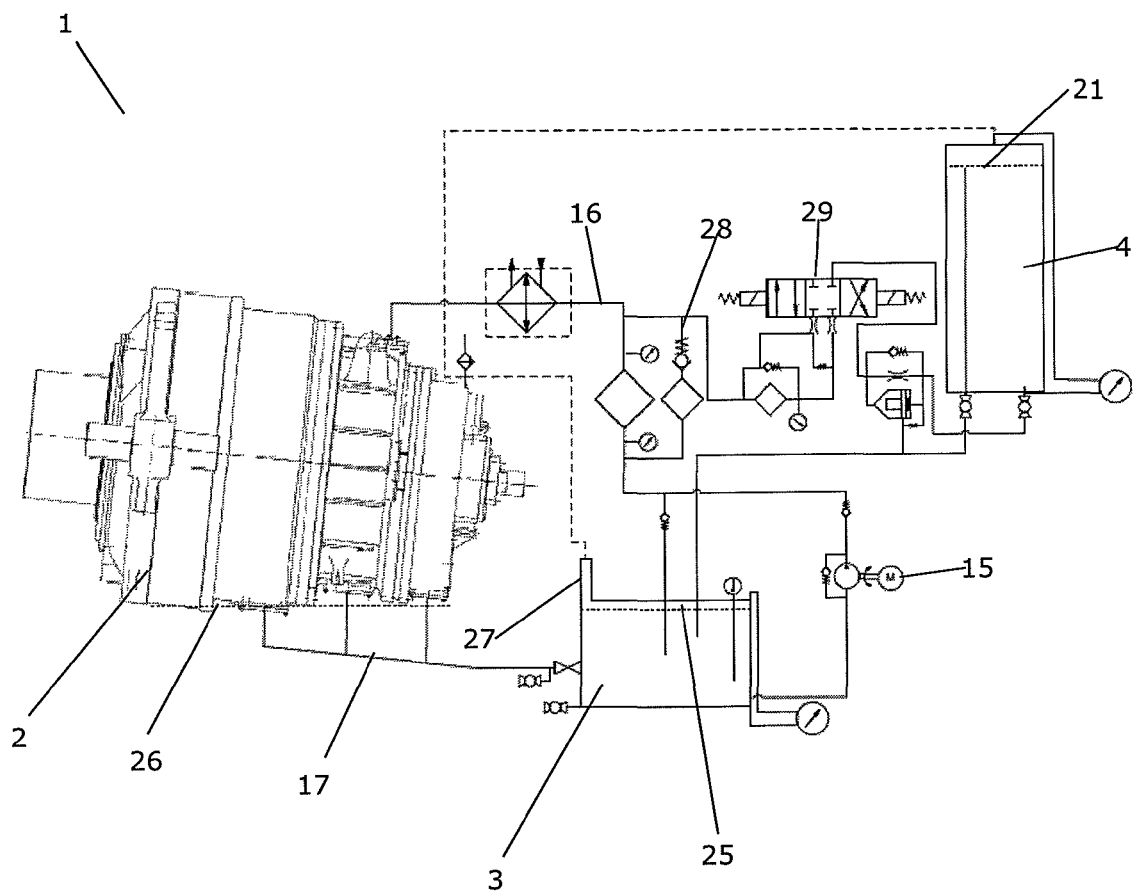
FIG. 5 is a diagrammatic view of a lubrication system according to a third embodiment of the invention during normal operation.
Figure 6:
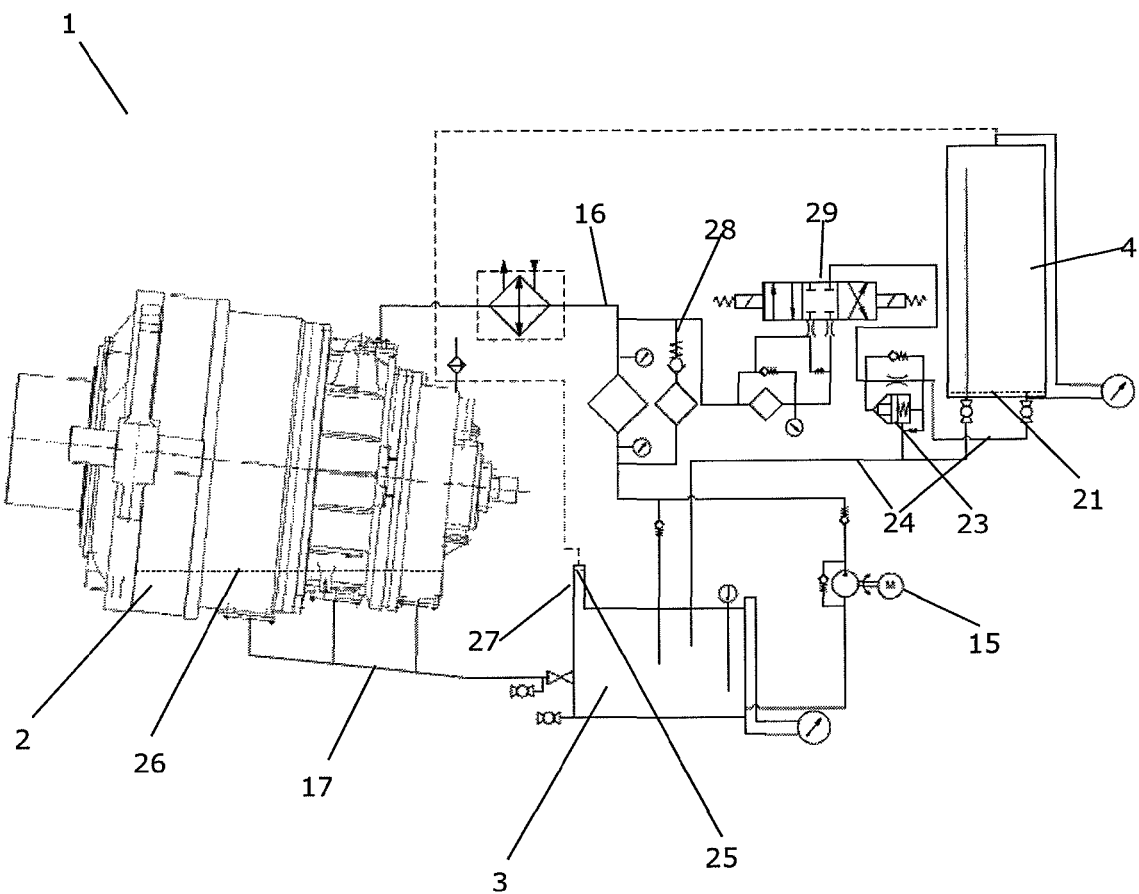
FIG. 6 is a diagrammatic view of the lubrication system of FIG. 5 during emergency operation.

FIGS. 5 and 6 are diagrammatic views of a lubrication system 1 according to a third embodiment of the invention. In FIG. 5 the lubrication system 1 is shown during normal operation, and in FIG. 6 the lubrication system 1 is shown in an emergency state. The lubrication system 1 of FIGS. 5 and 6 is very similar to the lubrication system 1 of FIGS. 3 and 4, and like components will therefore not be described in further detail here.

During normal operation, as illustrated in FIG. 5, pump 15 supplies lubricant to the gear system 2 via line 16 and distribution system (not shown). Furthermore, pump 15 supplies lubricant from the first reservoir 3 to the second reservoir 4 via line 28 and valve 29. Thus, the supply of lubricant to the second reservoir 4 is, in the third embodiment, provided as a partial flow of the lubricant flow supplied directly to the gear system 2 during normal operation. It is clear from FIG. 5 that the lubricant level 21 of the second reservoir 4 is relatively high, while the lubricant levels 25, 26 of the first reservoir 3 and the gear system 2, respectively, are relatively low during normal operation.

In the case of an emergency, such as a failure of the power supply to the pump 15, the lubricant supplies to the gear system 2 and to the second reservoir 4 are interrupted. The resulting pressure changes in the lubrication system 1 cause valve 23 to open, thereby allowing lubricant to leave the second reservoir 4 and enter the first reservoir 3, via lines 24 and valve 23. As a consequence, the lubricant level 21 in the second reservoir 4 is lowered, while the lubricant level 25 of the first reservoir 3 is raised. As a consequence, the lubricant level 26 of the gear system 2 is raised correspondingly via line 17, thereby allowing splash lubrication of the gear system 2. This is illustrated in FIG. 6.

It should be noted, that in the second embodiment illustrated in FIGS. 3 and 4, and in the third embodiment illustrated in FIGS. 5 and 6, the lubricant from the second reservoir 4 could, as an alternative, be supplied directly to the gear system 2 during emergency operation, instead of being supplied to the first reservoir 3 which is fluidly connected to the gear system.

The invention claimed is:

1. A lubrication system of a gear system of a wind turbine, the lubrication system comprising:
    a first reservoir adapted to contain lubricant,
    a second reservoir adapted to contain lubricant,
    pump means arranged to supply lubricant from the first reservoir to the second reservoir during normal operation,
    a distribution system fluidly connected between the first reservoir and the gear system in such a manner that lubricant can be supplied to the gear system from the first reservoir via the distribution system during normal operation,
    valve means being shiftable between a first position in which a flow of lubricant from the second reservoir directly towards the gear system or the first reservoir is prevented and a second position in which such a flow of lubricant is allowed,
    wherein the pump means operates during normal operation to supply lubricant from the first reservoir to the second reservoir without going through the gear system or the distribution system, and
    wherein the valve means operates in response to pressure changes in the lubrication system in such a manner that a predetermined pressure change automatically and directly causes the valve means to shift from the first position to the second position, and wherein the first reservoir is simultaneously fluidly connected to the distribution system and to the second reservoir via parallel flow paths when the valve means is in the first position.

2. The lubrication system according to claim 1, wherein the valve means is adapted to be in the first position during normal operation and in the second position in the case that an emergency situation is occurring.

3. The lubrication system according to claim 1, wherein the second reservoir is pressurized during normal operation.

4. The lubrication system according to claim 1, wherein the second reservoir is arranged in such a manner relative to the gear system and the first reservoir that lubricant can be moved by means of gravity from the second reservoir towards the gear system.

5. The lubrication system according to claim 1, wherein the valve means comprises at least one check valve.

6. The lubrication system according to claim 1, wherein the pump means is further adapted for supplying lubricant directly from the first reservoir to the distribution system during normal operation.

7. The lubrication system according to claim 1, further comprising an emergency supply path fluidly interconnecting the second reservoir and the gear system when the valve means is in the second position.

8. The lubrication system according to claim 1, further comprising an emergency supply path fluidly interconnecting the second reservoir and the first reservoir when the valve means is in the second position.

9. A wind turbine comprising a gear system and a lubrication system being arranged to provide lubrication for the gear system, the lubrication system comprising:
    a first reservoir adapted to contain lubricant,
    a second reservoir adapted to contain lubricant,
    pump means arranged to supply lubricant from the first reservoir to the second reservoir during normal operation,
    a distribution system fluidly connected between the first reservoir and the gear system in such a manner that lubricant can be supplied to the gear system from the first reservoir via the distribution system during normal operation,
    valve means being shiftable between a first position in which a flow of lubricant from the second reservoir directly towards the gear system or the first reservoir is prevented and a second position in which such a flow of lubricant is allowed,
    wherein the pump means operates during normal operation to supply lubricant from the first reservoir to the second reservoir without going through the gear system or the distribution system, and
    wherein the valve means operates in response to pressure changes in the lubrication system in such a manner that a predetermined pressure change automatically and directly causes the valve means to shift from the first position to the second position, and wherein the first reservoir is simultaneously fluidly connected to the distribution system and to the second reservoir via parallel flow paths when the valve means is in the first position.

10. A lubrication system of a gear system of a wind turbine, the lubrication system comprising:
    a first reservoir adapted to contain lubricant,
    a second reservoir adapted to contain lubricant,
    pump means arranged to supply lubricant from the first reservoir to the second reservoir during normal operation,
    a distribution system fluidly connected between the first reservoir and the gear system in such a manner that lubricant can be supplied to the gear system from the first reservoir via the distribution system during normal operation,
    valve means being shiftable between a first position in which a flow of lubricant from the second reservoir directly towards the gear system and a flow of lubricant from the second reservoir through the valve means and directly towards the first reservoir is prevented, and a second position in which a flow of lubricant from the second reservoir directly towards one of the gear system or the first reservoir is allowed, wherein the valve means operates in response to pressure changes in the lubrication system in such a manner that a predetermined pressure change automatically and directly causes the valve means to shift from the first position to the second position, and wherein the first reservoir is simultaneously fluidly connected to the distribution system and to the second reservoir via parallel flow paths when the valve means is in the first position.

* * * * *